(12) United States Patent
Van Den Bossche et al.

(10) Patent No.: US 7,192,141 B2
(45) Date of Patent: Mar. 20, 2007

(54) OPTICAL ARRANGEMENT FOR NON-INVERTING ILLUMINATION SYSTEM

(75) Inventors: Bart Van Den Bossche, Kuurne (BE); Koen Beyers, Wuustwezel (BE); Koen Van Belle, Kortrijk (BE); Peter De Meerleer, Oosterzele (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 10/785,249

(22) Filed: Feb. 24, 2004

(65) Prior Publication Data

US 2005/0185143 A1 Aug. 25, 2005

(51) Int. Cl.
*G03B 21/14* (2006.01)
*G02F 1/1335* (2006.01)
(52) U.S. Cl. .................. 353/33; 349/57; 348/757
(58) Field of Classification Search .............. 353/30, 353/33, 31, 98, 81, 102; 349/8, 9, 57; 348/750, 348/756–758
See application file for complete search history.

(56) References Cited

U.S. PATENT DOCUMENTS 6,344,927 B1 * 2/2002 Itoh et al. .................. 359/487
6,807,020 B2 * 10/2004 Wolfe ........................ 359/742
6,871,963 B2 * 3/2005 Nishida .................... 353/101

* cited by examiner

*Primary Examiner*—W. B. Perkey
*Assistant Examiner*—Andrew Sever
(74) *Attorney, Agent, or Firm*—Barnes & Thornburg LLP

(57) ABSTRACT

An optical design is described to be used in a color projection system. The system comprises a white light source (52), a light splitting means to split the white beam into color subbeams, optical components to direct each color subbeam on a light modulating means (56) and a dichroic prism (70). The light splitting means and the optical components are arranged such that each of the images of the color subbeams imaged on the light modulating means (56) has equal size and orientation, i.e. such that the magnification of the color subimage on the light modulating means (56) is equal. This is obtained by providing equal light paths for each color subbeam or by providing optical components such that either all different color images on the screen are inverted or none of the different color images are inverted.

25 Claims, 6 Drawing Sheets

OPTICAL ARRANGEMENT FOR NON-INVERTING ILLUMINATION SYSTEM

TECHNICAL FIELD OF THE INVENTION

The present invention relates to an optical system and methods of operating the same for a projection system. More specifically the present invention relates to an optical system and method of operating the same for a color projection system having a good throughput efficiency and good color uniformity.

BACKGROUND OF THE INVENTION

Large-screen, high-brightness electronic projection display apparatuses serve different broad areas of application: electronic presentations for e.g. business, education and advertising, entertainment for e.g. home theatre and electronic cinema, display of status and information for e.g. military, utilities and transportation, simulation in e.g. training and games. In all these areas the need to correctly display color images is large.

Electronic projection display apparatuses typically are based on one of three major technologies: CRT, liquid crystal display (LCD) technology or digital light processing (DLP) technology. Fixed format display methods include LCD and DLP technologies but exclude CRT. At the heart of a DLP projection display is provided a spatial light modulator (SLM) unit sometimes called a light valve unit. A spatial light modulator unit comprises at least one spatial light modulator, which is a device that modulates incident light in a spatial pattern corresponding to an electrical or optical input. The spatial light modulator is a pixelated device, i.e. an array of pixels display elements, wherein each pixel or group of pixels can be addressed and driven independently to project or display an arbitrary image. The spatial light modulator can modulate incident light in its phase, intensity, polarisation, or direction, and the light modulation may be achieved by a variety of materials exhibiting various electro-optic or magneto-optic effects or by materials that modulate light by surface deformation. An SLM comprises a one- or two-dimensional array of light-modulating elements. Silicon technology used in projection data monitors is capable of producing small-sized, two-dimensional light-valve arrays having several hundred thousand to several million light-modulating elements. Spatial light modulators are either transmissive or reflective. Transmissive devices modulate the light beam as it passes through the unit. Reflective devices modulate the light as it reflects from a mirror inside the unit. Typical examples of SLM devices are a deformable mirror device (DMD), also called digital mirror device or digital micromirror device, a reflective LCD device, an LCOS device, etc.

To obtain color projection systems basically three different types of projection systems are known : a single imager spatial color filter design, whereby each pixel is divided into three color subpixels; a single imager color field sequential system, whereby the beam is sequentially filtered to each primary color which is then modulated in the single imager, and a two, three or multi-imager parallel color system, whereby the light beam is split into two, three or more primary colors, each color beam is directed to an imager and the modulated color beams are converged into a single beam for projection. As the latter system allows the highest throughput efficiency, i.e. higher than three times the throughput efficiency of the other systems, the use of a three imager parallel color system is common.

Very often the three imager parallel color system uses an X-cube for color separation and recombination in the digital projection system. An X-cube is a dichroic prism which allows to split the white light of the light source into three primary colours and/or to recombine the three primary colours to one illumination beam for projection.

In order to obtain color images, either light of different sources having a different wavelength or wavelength range can be used, or, what is more common, the light of a white light source is used and split into a number, typically three, basic colors or color ranges. Very often these correspond with the three primary colors red, green and blue. As the need for high quality color projection image is rapidly increasing and as the human eye is very sensitive for color differences, the optics used to split the light of a white light source will play an important role and should be designed carefully. Not only are the sizes of the projection screens continuously increasing, so that small errors in color projection become relatively more important, the human eye is also very sensitive to color differences. Therefore, it is an essential feature to obtain an optimum color projection. This includes both a high contrast and a good color homogeneity, i.e. a reduced color shift.

The problem of improving contrast is discussed in U.S. Pat. No. 5,934,778, which describes an optical system for high contrast projection. As many systems suffer from color shifts created by incident angle dependency for dichroic prisms and from unwanted reflection of certain light colors, U.S. Pat. No. 5,934,778 suggests inclusion of additional filters to reduce the influence of unwanted reflected color beams on the contrast of other colors. It is alleged that this allows higher contrast images than with conventional systems.

One way to improve the color uniformity and homogeneity is providing equal path lengths for the different colors. This allows uniform magnifications of the illumination pattern for each of the three color channels. If illumination patterns with generally the same intensity uniformity profiles are formed and these are superposed, this allows improved uniformity of the color image.

U.S. Pat. No. 6,532,044 describes an electronic projector combining multiple projection lens assemblies with equal color component optical path lengths to provide improved display images and a compact arrangement. The document discusses the use of separate projection lens assemblies for each of the basic colours which are arranged in a non-linear, close-packed arrangement to receive the different color components of light. The arrangement does not comprise an X-cube but has different dichroic mirrors. Therefore, equal path lengths can be obtained using mirrors and dichroic mirrors, as suggested in U.S. Pat. No. 6,532,044. Nevertheless, as no convergence of the different color beams is performed, the system is relatively complex compared to conventional three imager parallel color systems. Three projection lens assemblies are provided, which makes the quality for color imaging strongly dependent of the quality and outlining of the different projection assemblies.

DE4313139 describes a projection system having a metal halide lamp emitting light in its three primary colors by a system of filters and mirrors. The system is built such that the three optical paths from the source to the LCD panels are all equal in length. The advantage of the system is that there is an improved projection by providing a shorter distance between the focus and the rear of the projection lens and that fewer dichroic mirrors are needed in the color synthesizer. Nevertheless, the system does not include an X-cube. This leads to additional problems with color shift and light intensity of the different colors in the illumination beam as after modulation the different color beams need to pass different and a different number of dichroic mirrors in order to form one single illumination beam.

In similar way, EP 0 458 687 describes a system having a large degree of compactness and a good resolution power. The system is based on a mirror system whereby each of the primary colors is modulated by a light modulating means. This system also does not comprise an X-cube and therefore recombination of the different color beams needs to be performed by different dichroic mirrors, leading to additional problems with color shift and light intensity of the different colors.

None of the above documents describes optimization of the color uniformity by providing equal path lengths for the different colors for systems using an X-cube for the splitting and/or recombination of the light.

SUMMARY OF THE INVENTION

It is an object of the present invention to provide a device and a method for projecting color images having a high color uniformity.

The above objective is accomplished by a method and device according to the present invention.

A color projection system for projecting an image on a screen is described, comprising at least one light source for emitting a white light beam and a light splitting means for splitting the white light beam into color subbeams. Each subbeam comprises light of a different wavelength or wavelength range. The color projection system furthermore comprises, for each of the color subbeams, a light modulating means and a dichroic prism for recombining the color subbeams. Each of said modulating means is positioned adjacent to a side of the dichroic prism. The color projection system furthermore comprises further optical components for imaging each of the color subbeams onto its light modulating means such that the images of each of the color subbeams on the corresponding light modulating means have a substantial equal size and such that the images of each of the color subbeams on the screen have the same orientation.

The images of each of the color subbeams may have a substantial equal size which may be such that differences between the size of the images of each of the color subbeams on the corresponding light modulating means are preferably smaller than 5%, more preferably smaller than 1%, most preferably smaller than 0.5%. The color projection system furthermore may be adjusted such that the light path from at least one light source to behind the dichroic prism is situated in one plane. The dichroic prism may be an X-cube.

The color projection system may be such that for an image representing a plane of equal color, the distance between the average color coordinates in the 1976 CIE Chromaticity Diagram for the ANSI-points at the left side of the image on the screen and for the ANSI-points at the right side of the image on the screen is preferably smaller than 0.01, more preferably smaller than 0.007, most preferably smaller than 0.005. This distance is measured in the 1976 CIE Chromaticity Diagram. The ANSI points are defined as the points that are at the center of the rectangles created by dividing an image on a screen into 9 equal rectangles. The rectangles do not overlap but cover the whole image.

The optical components of the color projection system furthermore may comprise a first imaging lens, whereby for each color subbeam the light path length between the first imaging lens and the light modulating means is preferably equal within 1%, more preferably equal within 0.1%, most preferably equal within 0.01%. This means that the difference in length may, preferably, not be larger than 1%, more preferably not larger than 0.1%, most preferably not larger than 0.01%. The first imaging lens is the imaging lens which is closest in the light path to the light source or light sources.

The light splitting means may comprise at least a first light splitting device for splitting the white beam in a first color beam comprising light of a first wavelength or wavelength region and a further color beam, whereby the first light splitting device may be positioned in the pupil of the first imaging lens.

The first light splitting device may be a dichroic mirror. The dichroic mirror may have a small incidence angle dependency. The dichroic mirror in the color projection system may be transmitting a first part of the light beam and reflecting a second part of the light beam and may have, preferably, a 50% transmission point whereby 50% of the light beam is transmitted, wherein the small incidence angle dependency is such that the difference for the wavelength at which the 50% transmission point of the dichroic mirror is positioned for different angles of incidence, may be preferably smaller than 25 nm, more preferably smaller than 17 nm, most preferably smaller than 7 nm.

The further optical components furthermore may comprise color filters. The optical components also may comprise a further number of imaging lenses positioned in the light paths of the different color subbeams, wherein either for each color subbeam, the number of imaging lenses is even or for each color subbeam the number of imaging lenses is odd. The light modulating means may be transmissive light modulating means and the color projection system may not comprise a mirror between the transmissive light modulating means and the dichroic prism.

The optical components of the color projection system furthermore may comprise a number of mirrors positioned in the light paths of the different color subbeams, wherein either for each color subbeam the number of mirrors is even or for each color subbeam the number of mirrors is odd.

The invention also relates to a method for projecting a color image, comprising the steps of driving one or more light sources to create a white light beam, splitting said white light beam in color subbeams, each comprising light of a different wavelength or wavelength region, imaging each of said color subbeams on a light modulating means, positioned adjacent to a side of a dichroic prism, modulating each of said color subbeams by said light modulating means and recombining said modulated color subbeams in said dichroic prism and projecting said recombined light beam. The imaging each of said color subbeams on a light modulating means thereby is performed such that the image on the light modulating means has equal size for each of said color subbeams and such that the image on the screen has equal orientation for each of said color subbeams. In the method, said imaging may be performed such that the light paths between a first imaging lens, being the image lens positioned closest in the light path to the at least one light source and the light modulating means for each of the color subbeams are preferably equal in length within 1%, more preferably equal within 0,1%, most preferably equal within 0.01%.

It is a specific advantage of the present invention that the optical recombination system is based on an x-cube, thereby avoiding or at least reducing the use of mirrors on the light paths downstream the light modulating means and thus avoiding strong influences of small errors in flatness which may occur in the mirrors. It is a specific advantage of the present invention that the color beams are combined in a single optical component, thereby reducing the chance of errors introduced by shift of multiple optical components with respect to each other.

It is a specific advantage of the present invention that for each color, the image on the light valve has an equal magnification and has an equal sign of magnification, i.e. that either none of the color images is inverted or all of the color images are inverted.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and apparatus for optical systems for projection systems.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings. Reference numbers in the drawings refer to the same or similar elements.

DESCRIPTION OF ILLUSTRATIVE EMBODIMENTS

Figure 1:
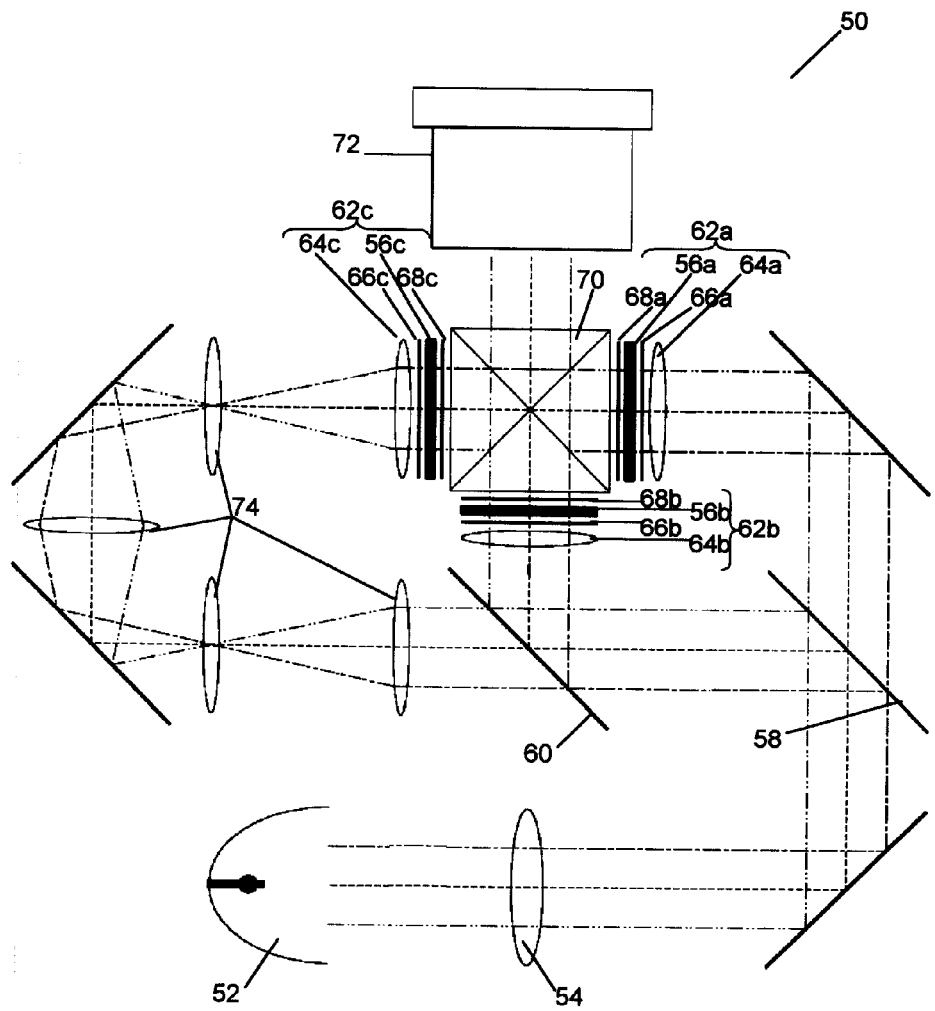
FIG. 1 is a schematic representation of the light path in an optical system providing double inversion according to a first embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

FIG. 1 shows an optical system for a color projection system according to an embodiment of the present invention. The present invention relates particularly to the color splitting and recombination system of a projector system, and it is not expected that the invention is limited by the integrating method. Hence, the optical system, i.e. the color splitting and recombination system, as proposed in any of the embodiments of the present invention can be used with light tunnels, with light guides, with light rods, with integrator lenses or any other integrating method.

The optical system 50, shown in FIG. 1, comprises one or more light sources 52 which may be any light generating device, e.g. a metal halide lamp or an LED array. The light source 52 also may include a parabolic or elliptic reflector to optimally reflect the back projected light from the light source 52. The optical systems furthermore may comprise lenses and mirrors. The lenses typically are made of optical glass and may have an anti-reflective coating on both sides. Other type of lens materials may be used such as quartz, but these are less preferable as these are more expensive. In similar way dichroic mirrors typically are made of standard glass, such as float glass, and comprise coatings which e.g. reflect a first set of colors and transmit the remaining colors. These dichroic mirrors can e.g. be obtained from the company UNAXIS, for example. The dichroic mirrors furthermore may comprise standard anti-reflective coatings.

In the current embodiment, the light beam coming from the light source 52 is imaged using one imaging lens 54 onto spatial light modulating means 56 for the different colors, i.e. a light modulating means for a first color 56*a* e.g. blue, a light modulating means for a second color 56*b* e.g. green and a light modulating means for a third color 56*c* e.g. red. After the light beam has passed the imaging lens 54, the light beam is split in different subbeams having different colors. This is performed using any suitable color splitting device, e.g. dichroic mirrors 58 and 60 allowing certain colors to pass through the mirror, whereas other colors are reflected. After the original light beam has been split into the color subbeams, the different color subbeams are imaged onto the light modulating means 56. The light modulating system 62 used can comprise any type of light modulating means 56. The light modulating means 56 can be any of a transmissive liquid crystal display device, an LCOS device a deformable mirror device (DMD), also called digital mirror device or digital micromirror device, a reflective LCD device, . . . . Depending on the type of light modulating means 56 used, the light modulating system 62 also may comprise a lens 64, a polarizer 66 and an analyzer 68, . . . . As an example, the optical system will be described using a transmissive LCD device as a light modulating means 56. The polarizers 66 and analyzers 68 can be standard optical components, as may e.g. be obtained from the company Polatechno, for example.

The light modulating means 56 act as imagers, i.e. they modulate the different color subbeams such that for each of these colors an arbitrary image is created. The light modulating means comprise an array of light modulating elements. The light modulating elements can be addressed and driven such as to display an arbitrary image. After this modulation, the different subbeams are converged in a single beam using an X-cube 70. An X-cube is typically made of optical glass and has anti-reflective coatings on all sides of the X-cube 70. The X-cube allows recombining the different color subbeams into one light beam which is directed to a projection lens 72 to project the image, consisting of the three color subimages, onto a screen (not shown in FIG. 1). For the present example, an X-cube 70 is used having an s-p-s polarization, meaning that the X-cube 70 is optimised for receiving the red and the blue color subbeam having a first polarization, i.e. the s-polarization, an receiving the green subbeam having a second polarization, i.e. the p-polarization. The analyzing means 68 are adjusted to obtain the correct polarization for the color subbeams in the present example. The invention is not limited to the use of an s-p-s-polarization X-cube, other X-cubes also can be used.

It is an important advantage of the current invention that the projector system combines compactness, i.e. whereby the light system has a light path that is situated in one plane, and an optimized color uniformity, i.e. whereby the image of the different color beams all have the same size on the light modulating means 56 and all have the same orientation, i.e. that the magnification for each of the color light beams is the same on the light modulating means 56. The term "the same magnification" means that both the size of each of the images is the same and the sign of the magnification is the same. This can be achieved by optimizing the position and the number of lenses in each of the light beams and color light subbeams.

Conventional systems working with X-cubes, which are working with an imaging lens on the white light beam and a color splitting means further downstream the light path, i.e. in positions significantly different from the pupil plane of the imaging lens, have for at least one of the light paths for the different colors a different length compared to the other light paths. Therefore, an additional lens system for one-to-one imaging is needed if correction of the image size of the corresponding light beam on the light modulating means 56 is to be achieved. In this way, for conventional systems, the image typically is inverted for one of the colors.

In an aspect of the present invention, the lens system used in the light system for the projection system is designed such that the size of the color images and the orientation of the color images on the light modulating means are substantially equal for all different colors. The differences between the sizes of the different color images is preferably smaller than 5%, more preferably smaller than 1%, most preferably smaller than 0.5%. Obtaining the same orientation for all color images on the screen means that there either has to be an odd number of imaging lenses for each of the color images on the light modulating means 56 or that an even number of imaging lenses for each of the color images on the light modulating means 56, i.e. in each of the color subbeams of the light system. Thus, typically, as well as an additional one-to-one imaging system, also a second one-to-one imaging system is provided, such that the image in the color light path comprising the one-to-one imaging systems is doubly inverted. If mirrors are used in the systems, it is also necessary that the number of mirrors is either odd for all color light subbeams or even for all color light subbeams, such that no different mirrored color images on the screen are obtained. It is to be noted that the mirror inside the x-cube should also be taken into account for counting the total number of mirrors for each light subbeam.

An illustration of such a system is shown in FIG. 1 whereby, in order to obtain an equal magnification for all different color light paths additional lenses are added in one color light path. A light beam from a light source 52 is directed to an imaging lens 54 and then directed to a dichroic mirror 58 to split the light beam into a blue and a yellow subbeam. The blue light subbeam is directed onto a light modulating system 62a whereby an image is generated in the blue light subbeam. The yellow subbeam is directed onto a second dichroic mirror 60 and the green part is directed onto a light modulating system 62b, whereby an image is generated in the green light subbeam. The remaining part of the yellow subbeam, i.e. the red subbeam, is directed onto a light modulating system 62c, whereby an image is generated in the red light subbeam. The subbeams are recombined in an X-cube 70, whereafter the recombined beam is directed to a projection lens 72 to be projected onto a screen. The light path of the red subbeam is significantly longer than the light paths of the other subbeams. Therefore, in order to obtain the same magnification, a lens system is provided in the longer light path. In the current embodiment, a double one-to-one imaging is performed in the red subbeam in sequence using a double set of additional lenses 74. In this way the red color image is inverted twice and therefore, no or less discoloration will be visible.

Especially if transmissive light modulating means are used, the current embodiment has the advantage that each of the light modulating means can be positioned close to the x-cube, thus providing a very short light path between each of the light modulating means and the x-cube. In these cases, no additional mirror is necessary to guide the ligh beams from the light modulating means to the x-cube.

Figure 2:
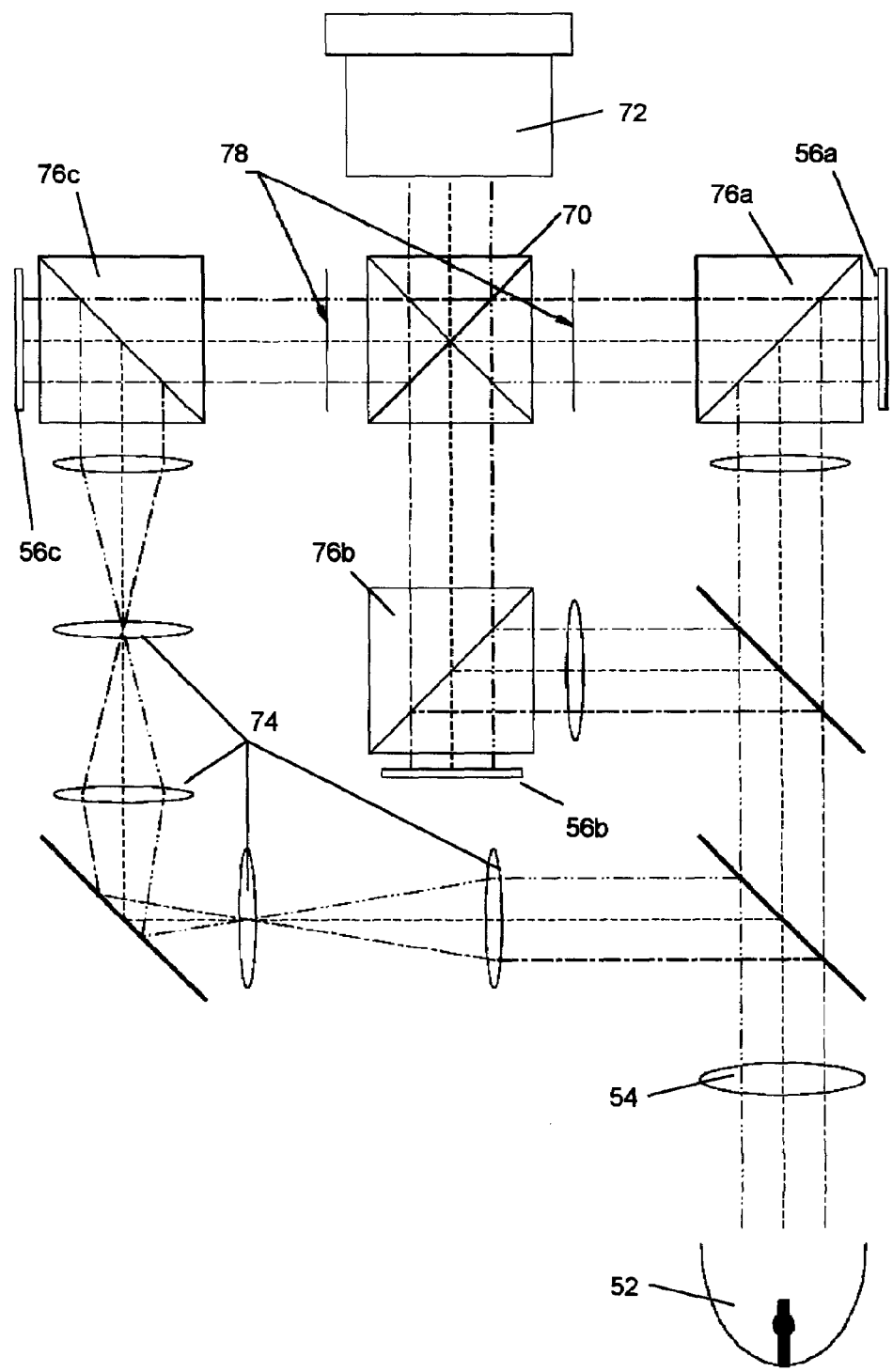
FIG. 2 shows a schematic representation of the light path in another optical system providing double inversion according to a first embodiment of the present invention.

FIG. 2. shows an alternative example of the present embodiment, showing the same components as the previous example, but wherein the light modulating system 62 is based on reflective spatial light modulating means 56 that are not positioned directly in the vicinity of the x-cube 70. The light in the different light paths is first directed to the light modulating means 56 by reflection on a mirror 76 making an angle of 45° with the light modulating means 56, then modulated by driving the light modulating means 56 and subsequently directed towards the x-cube 70 through the mirror 76. For the present example, again an x-cube 70 is used having an s-p-s polarization, meaning that the x-cube 70 is optimised for receiving the red and the blue color subbeam having a first polarization, i.e. the s-polarization, an receiving the green subbeam having a second polarization, i.e. the p-polarization. To obtain the correct polarization for the red and the blue subbeam in the present example, a half wavelength plate 78 is provided in the light paths of both the red and the blue subbeam. The present example again illustrates that additional optical components are used to obtain a substantially equal magnification, i.e. obtaining images on the light modulating means that preferably differ less than 5%, more preferably less than 1%, most preferably less than 0.5% in size, and in order to obtain images for the three subbeams that have the same orientation on the screen. The number of lenses and mirrors is again such that either all color images are mirrored odd times or all color images are mirrored even times thus obtaining that the total image obtained on the screen has the same orientation for all different color images. As an additional mirror 76 is needed to guide the light subbeams to the x-cube, systems having reflective light modulating means 56 are less optimum and less compact than systems having transmissive light modulating means 56, but they still have the advantage of obtaining a reduced color shift, based on the image size of the color images on the light modulating means 56 and based on the equal image orientation of the color images on the screen.

Figure 3:
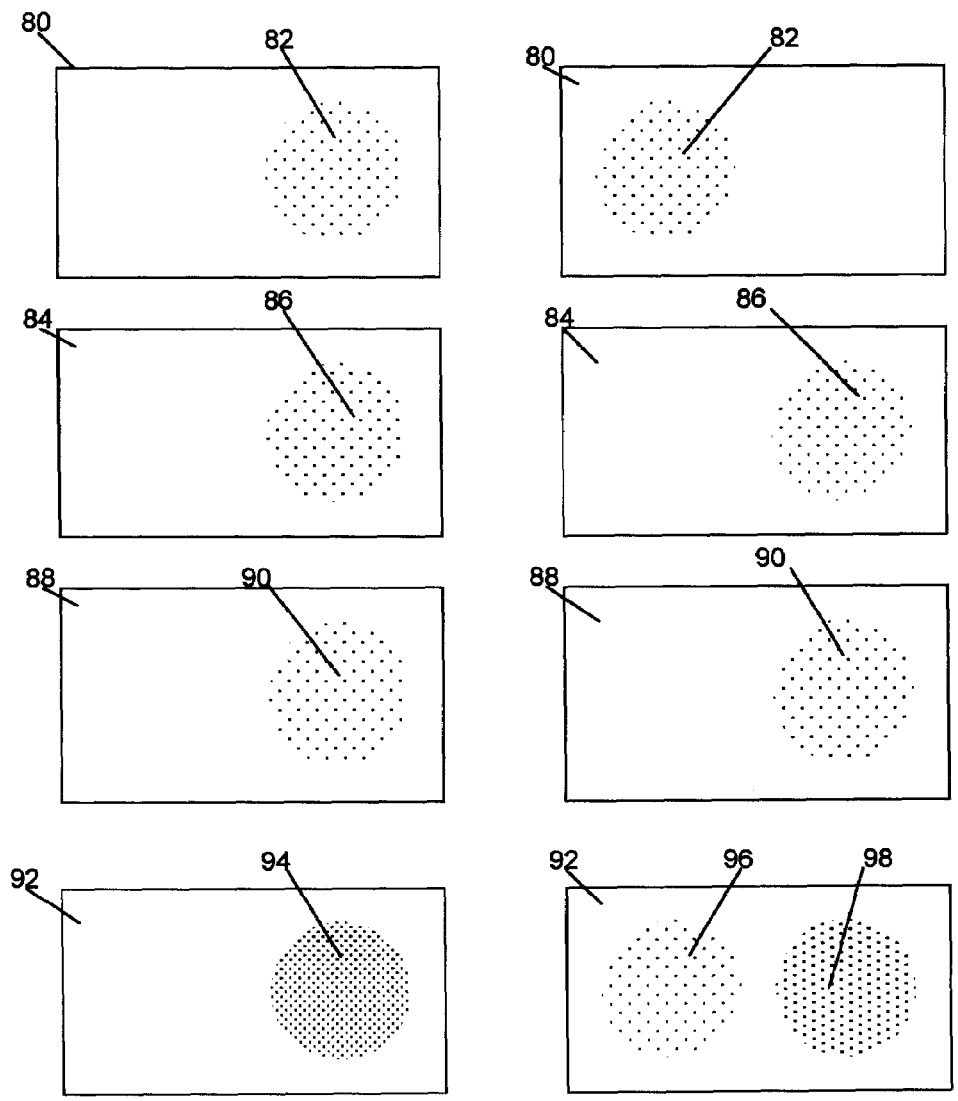
FIG. 3 is a schematic representation of the color subimages and the corresponding full color image for both a non-inverting and an inverting optical system.

The impact of inversion of one of the color images on the inhomogeneity of the color has not been fully appreciated up till now. The impact of inversion of one of the color images on the inhomogeneity is illustrated in FIG. 3. On the left hand side of FIG. 3 color subimages as can be imaged on the light modulating means 56 and the corresponding full color image is shown for a system not inverting or inverting the color subimages an even number of times, whereas on the right hand side of FIG. 3 color subimages as can be imaged on the light modulating means 56 and the corresponding full color image is shown for a system inverting one of the color subimage an odd number of times. The three color subimages 80, 84, 88 are shown, furthermore showing a small area 82, 86, 90 with a higher brightness, corresponding with a spot having a higher brightness in the illumination beam. On the right hand side, the color subimage 80 is inverted. The subimages correspond with settings of the light modulating means 56 such as to obtain a homogeneous color. For the system not inverting or inverting the color subimages an even number of times, the combination of the three color subimages leads to a full color image 92 with an area 94 having an increased brightness but not having color inhomogeneities, whereas for the system inverting one of the color subimage an odd number of times, the combination of the three color subimages leads to a full color image 92 showing a first area 96 and a second area 98 having not only a different brightness, but also a difference in color for both area 96 and area 98.

In other words, in conventional systems a mirrored image of one of the colored images is created with respect to the other colored images. Any brightness non-uniformity in the object thus causes a color non-uniformity in the image on the screen. The human eye is very sensitive to color non-uniformity and thus, a brightness non-uniformity in the object is seen as a discoloration. In systems according to the present invention, i.e. without the inversion of one of the colored images, a non-uniformity in the object causes a brightness non-uniformity on the screen image. As the human eye is less sensitive to brightness non-uniformities, this reduces the problem significantly.

A measure for representing color differences is the shift in the CIE 1976 U.C.S. Chromaticity Diagram, as defined by the "Commission Internationale de l'Eclairage" (CIE) in 1976. As a measure for the color non uniformity in a projection system, the distance between the color coordinates in the u'v' color diagram for a point at the left side of the image and a point at the right side of the image is discussed, for an image that in principle should have the same color coordinates for all points of the image, i.e. an image whereby all points of the image should have a color corresponding with the same point in the color diagram, for all points of the image. In this color space, the distance corresponds directly with a visual color difference. The color shift Δu'v' between a point left and a point right of a white image on a display thus is a measure for the color inhomogeneity and is defined by $$\Delta u'v' = \sqrt{(u'(\text{left}) - u'(\text{right}))^2 + (v'(\text{left}) - v'(\text{right}))^2}$$

A smaller Δu'v' thus means that the color coordinates of a point left and right on the screen are positioned closer together, so that the color difference between the two point is appearing smaller for the human eye.

TABLE 1

| Optical system | Δu'v' |
|---|---|
| conventional system | 0.013 |
| equal light path with X-cube | 0.0064 |
| double inversion optical system | 0.0045 |

Table 1 shows values for the left-right color shift for a conventional system (line 2) and the left-right color shift for a system having a double inverted color image for one of the different colors (line 4). For conventional systems, such as e.g. described in U.S. patent application 5,934,778, the average shift in the color diagram typically is about 0.013, whereas for a double inversion optical system, as discussed in the present application, the color shift is reduced to 0.0045. This color shift is measured according to the following procedure. The image on the screen is divided in 9 rectangles, which do not overlap and fill the image on the screen completely. The centers of these rectangles define the 9 ANSI-points (American National Standard Institute). These 9 ANSI points are typically used to define characteristics of a display. The color shift is measured by measuring the x and y CIE 1976 color coordinates, which can be converted to u' and v' CIE 1976, averaging the u' and v' values for the 3 ANSI points at the left side of the image and for the 3 ANSI points at the right side of the image and determining the distance in the CIE 1976 U.C.S. Chromaticity Diagram between the average u' and v' values for the left ANSI points and the average u' and v' values for the right ANSI points. Typically the human eye can see color differences that are separated 0.004 in the u'v' color diagram. Furthermore, the external conditions play an important role, i.e. the amount of stray light present from the environment, the brightness of the image and even the status of the person looking at the image, i.e. whether this person is tired, what the quality of the eyes of the viewer is, etc.

Figure 4:
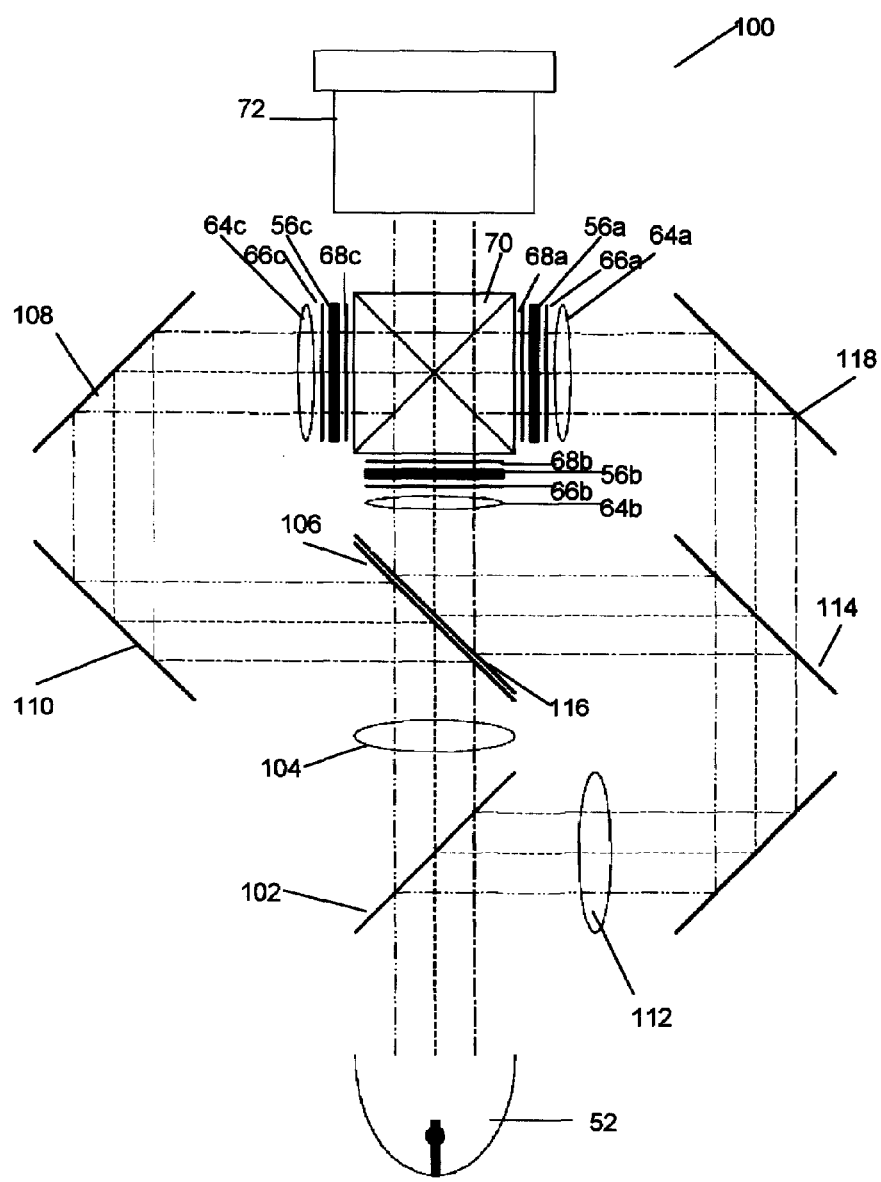
FIG. 4 is a schematic representation of the light path in an optical system providing equal path lengths for the different color subbeams according to another embodiment of the present invention.

In FIG. 4 a schematic representation of an optical system for a projection system 100 according to a second embodiment of the present invention is shown. The projection system comprises a light source 52, a number of optical components, a number of light modulating means 56 for forming an image for a corresponding number of color subbeams which are created, an X-cube 70 for recombining the color subbeams and a projection lens 72 for projecting the images on a screen. According to the present invention, the images of the color subbeams projected onto the light modulating means 56 have the same magnification and the same orientation. The differences in magnification between the sizes of the different color images are preferably smaller than 5%, more preferably smaller than 1%, most preferably smaller than 0.5%. In this embodiment, this is performed by providing equal light paths for all color subbeams. With equal light paths, it is meant that the distances between the imaging lens or imaging lenses and the light modulating means 56 are preferably equal, for all colors, within 5%, more preferably within 1%, most preferably within 0.1%.

The light source 52 used for generating the light beam may be any light generating device, such as e.g. a metal halide lamp or an array of LEDs. The light source may have a parabolic shaped or elliptic shaped reflector to optimally direct the light out of the light source 52.

Figure 5:
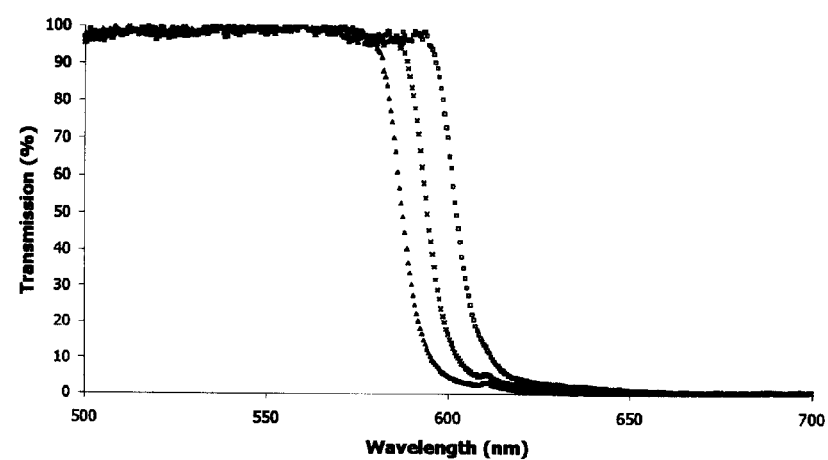
FIG. 5 is a graph showing the incidence angle dependence of the dichroic mirror for splitting the light beam, according to a specific feature of the present invention.

Whereas in systems not using an X-cube, the position of the different light modulating means can be changed in order to obtain equal light paths for all colors, this is not possible for systems using an X-cube. Therefore, if the system comprises an X-cube for recombining the color subbeams and if the light modulating means 56 are positioned near this X-cube 70, a specific optical setup is needed. A compact optical system, whereby the light path is completely situated in one plane and whereby equal light path lengths for all colors are provided, can only be made if light splitting means 102 are provided near the pupil of the imaging lens, preferably at the pupil of the imaging lens(es). Positioning the light splitting means at the pupil of the imaging lens is preferred as by placing the light splitting means not exactly at the pupil, the angles of incidence are increased, leading either to loss of light as more light needs to be cut away out of the spectrum or to more discoloration. It is not obvious to position the light splitting means 102 at the pupil of the imaging lens. The light splitting means 102 typically is a dichroic mirror which suffers from incident angle dependent color shift. The latter can not be corrected using a gradient filter, which is the standard solution to solve for angle dependency if the dichroic mirror is placed away from the pupil of the imaging lens. Therefore, in the current embodiment, the light splitting means 102 should be selected specifically such that the angle dependency of the dichroic mirror is minimal. An illustration of such an angle dependency of the dichroic mirror is shown in FIG. 5. FIG. 5 shows a graph of the transmission of a dichroic mirror as a function of the wavelength for different angles of incidence. The dichroic mirror substantially blocks a first part of the white light, transmits a second part of the white light and shows a transition area. The 50% transmission point, i.e. the wavelength at which the transmission for the light is 50%, is strongly angle of incidence dependent. The graph shows the 50% transmission point for an angle of incidence (AOI) of 45° (triangle), an angle of incidence (AOI) of 40° (cross) and an angle of incidence (AOI) of 35° (square). It can be seen that the angle dependency for this dichroic mirror is limited, i.e. there is only a shift in wavelength of the 50% transmission point of about 6 nm between an AOI of 45° and an AOI of 40° or between an AOI of 40° and an AOI of 35°, whereas in other dichroic mirrors this can be significantly larger. FIG. 5 also illustrates that the color shift angle the dependency of the dichroic mirror cannot be reduced completely by an optimised selection of the dichroic mirror, i.e. there always will remain some angle dependency. Hence, in accordance with an embodiment of the present invention further means may be provided to filter unwanted light from the different color subbeams.

A layout for an optical system according to this embodiment is shown in FIG. 4. The light beam is directed to a light splitting means 102 to split the light beam in different color components. For color projection systems, typically three color subbeams are used, which may be but is not limited to the primary colors red, green and blue. These colors typically are defined by the wavelength of the emitted light or the wavelength region wherein the wavelength of the emitted light is situated. By way of illustration, an example will be discussed whereby the light beam is split into a red, green and blue subbeam, although the invention is not limited thereto.

The light splitting means 102 splits the light beam into different colored subbeams, i.e. a first subbeam comprising light of a first color, in this example red, and a second subbeam comprising light of the remaining colors, in this example green and blue. As mentioned before, it is an important feature of the current embodiment of the present invention that the first splitting of the light beam is performed in the pupil plane of the imaging lens with telecentric illumination. This allows to obtain equal light paths for the different color subbeams in a compact setup of the projection system. The latter leads to color subimages having an equal size on the light modulating means 56, thereby reducing the color shift.

In order to direct the subbeams on the light modulating means 56, additional optical components are used, which can be lenses and/or mirrors. The lenses typically are made of optical glass and have standard anti-reflecting coatings on both sides. The lenses also can be made of other material, e.g. quartz, but optical glass is preferred as this material is less expensive. The mirrors typically are made of float glass and have standard reflecting coatings on one side. These coatings can be obtained from the company UNAXIS. Sometimes, e.g. for further splitting of colors, dichroic mirrors are used, typically made of float glass and comprising a dichroic reflecting coating, available from the company UNAXIS, allowing to transmit certain colors, while other colors are reflected. Mirrors where light passes through can have antireflective coatings. The light splitting means 102 typically is a dichroic mirror, which in the present example transmits red light into a first light path, while cyan light is reflected on a second light path. The red light subbeam is focussed by an imaging lens 104 on the light modulating means 56c corresponding with the red light subbeam. After the red light subbeam has passed the imaging lens 104, the mirrors 106, 108, 110 direct the red light subbeam onto a light modulating system which comprises a light modulating means 56c and, depending on the type of light modulating means 56c used, furthermore may comprise a lens 64c, a polarizer 66c and an analyser 68c. The latter components are introduced if e.g. the light modulating means 56c are a transmissive LCD panel.

In similar way, light from in the second light path will be imaged on the light modulating means 56b, 56c by an imaging lens 112 and directed by a mirror on a dichroic mirror 114 for splitting the cyan subbeam into a green subbeam and a blue subbeam. The green subbeam is then directed onto a further mirror 116 and finally onto a light modulating system, which comprises a light modulating means 56b and furthermore may comprise a lens 64b, and a polarizer 66b and analyzer 68b depending on the light modulating means used. The light modulating system can have any or all of the characteristics described above with respect to the light modulating systems used in other embodiments. In similar way, the blue light subbeam is directed on the light modulating system using a further mirror 118. The light modulating system comprises a light modulating means 56a, and furthermore may comprise a lens 64a and a polarizer 66a and analyzer 68a depending on the light modulating means used. The light modulating means can have any or all of the characteristics described above with respect to the light modulating means used in other embodiments.

As the light splitting means 102 may still suffer from a limited angle dependency, the first subbeam and the second subbeam may include some color shifted light. Therefore it is a specific feature of this embodiment to provide additional color filters. These color filters are position in the light path of two color subbeams. These two color subbeams are the subbeams corresponding with the color that is first separated from the other colors in the pupil plane and with the neighboring color, i.e. the color which is closest to the first separated color in the wavelength spectrum. In the present example, the color filters thus will be positioned in the light path of the red and the green subbeam. These color filters also can be dichroic mirrors, made of standard glass, such as float glass, and comprising a coating to filter specific colors, as can be obtained from then company UNAXIS. In the present example, the color filters are introduced by replacing the mirrors in the different light paths with dichroic mirrors. In this way it is possible to filter out the yellow light generated by color shift due to incidence angle dependency. Furthermore if e.g. a mercury lamp is used, in this way also the yellow mercury spectral line is removed, which is an additional advantage of the system. As mentioned above, after the color subbeams are modulated to form a color subimage, the subbeams are recombined using an X-cube 70. The recombined light beam will be projected on a screen by a projection lens 72.

Additionally, the discoloration, i.e. the inhomogeneity in color or color shifts, on the screen also can be reduced further by taking into account the number of mirrors that are used for each of the color beams. As discussed in the first embodiment and shown in FIG. 3, the color inhomogeneities can be further reduced if the number of mirroring parts for each of the colors is all even or all odd. Also the mirror in the X-cube has to be taken into account. The distance between the color coordinates of a point left and a point right of an image that in principle displays one color, i.e. the image left-right color shift, for a system providing equal path lengths according to the present embodiment of the invention, is 0.0064. This is less than half the left-right color shift of a conventional system (0.013). This is also shown in Table 1.

It is a specific advantage of the current invention that in a non inverting illumination system, which may also include double inversion, the colored images all have the same orientation after recombination by a prism, so the visual non uniformity in color is reduced. This is a significant advantage over conventional systems using color splitting to obtain color images based on driving separate light valves for the primary colors, whereby typically one additional lens is used in the light path of one color subbeam. The problem of inversion of one of the images of the color subbeams onto the light valve, which was not fully explored previously, leads to serious color inhomogeneity problems, which can be avoided or improved using the teachings of the present invention.

Figure 6:
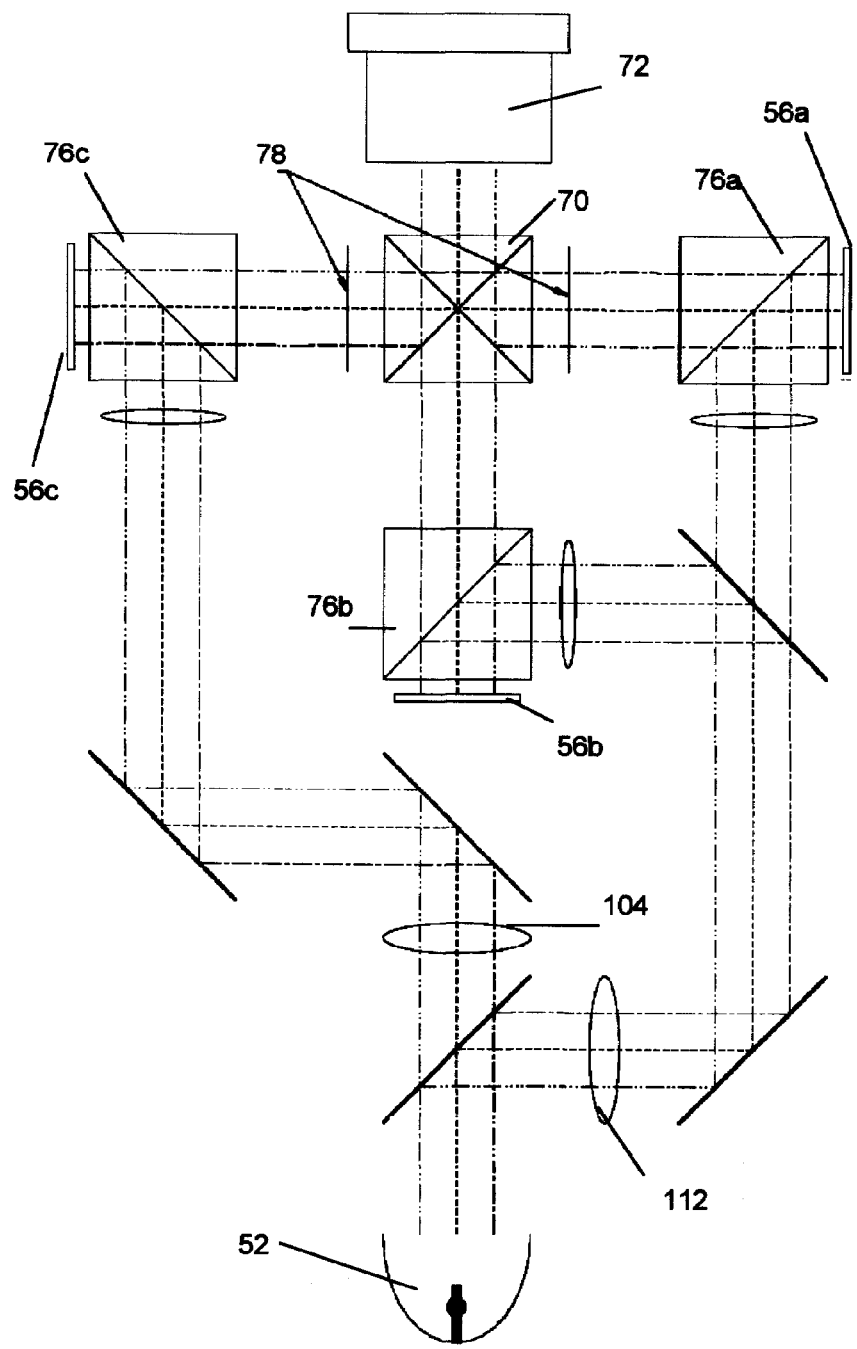
FIG. 6 shows a schematic representation of the light path in another optical system providing equal light paths for the different color subbeams according to the second embodiment of the present invention.

Especially if transmissive light modulating means are used, the current embodiment has the additional advantage that each of the light modulating means can be positioned close to the x-cube, thus providing a very short light path between each of the light modulating means and the x-cube. In these cases, no additional mirror is necessary to guide the light color subbeams from the light modulating means to the x-cube. FIG. 6 shows another example of the current embodiment wherein an equal path length system with reflective light modulating means 56 is shown. The color projection system has the same components as the previous example, but the light modulating system 62 now is based on reflective light modulating means 56 that are not positioned directly in the vicinity of the x-cube 70. The light in the different light paths is first directed to the light modulating means 56 by reflection on a mirror 76 making an angle of 45° with the light modulating means 56, then modulated by driving the light modulating means 56 and subsequently directed towards the x-cube 70 through the mirror 76. Half wavelength plates 78 are provided to obtain the correct polarization of the color subbeams for use with an s-p-s X-cube 70. Although the current example of the present embodiment is less optimum and less compact, it still has the advantage of providing substantially equal path lengths for the different color beams between the imaging lens which is closest in the light path to the light source or light sources and the light modulating means, i.e. the path lengths do not differ more than 1%, preferably do not differ more than 0.1%, more preferably do not differ more than 0.01%.

It is additional specific advantage of the embodiments of the present invention that the light path from the light source or light sources till behind the dichroic prism, e.g. the x-cube is situated in one plane. It is furthermore a specific advantage of the previous embodiments of the present invention that the systems are compact. Furthermore it is a specific advantage of the embodiments of the present invention that the size of the different color images on the light modulating means are substantially equal in size and have the same orientation.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A color projection system for projecting an image on a screen, comprising at least one light source for emitting a white light beam, a light splitting means for splitting said white light beam into color subbeams each comprising light of a different wavelength or wavelength range, for each of said color subbeams a light modulating means, and a dichroic prism for recombining said color subbeams, each of said modulating means positioned adjacent to a side of said dichroic prism, wherein said color projection system furthermore comprises further optical components for imaging each of said color subbeams onto the relevant light modulating means such that the images of each of said color subbeams on the corresponding light modulating means have a substantially equal size and such that the images of each of said color subbeams on the screen have the same orientation and such that for an image representing a plane of equal color, the distance between the average color coordinates in the 1976 CIE Chromaticity Diagram for the ANSI-points at the left side of the image on the screen and for the ANSI-points at the right side of the image on the screen is smaller than 0.01.

2. A color projection system according to claim 1, wherein images of each of said color subbeams have a substantial equal size comprises that differences between the size of said images of each of said color beams on the corresponding light modulating means are smaller than 5%.

3. A color projection system according to claim 2, wherein differences between the size of said images of each of said color beams on the corresponding light modulating means are smaller than 1%.

4. A color projection system according to claim 2, wherein differences between the size of said images of each of said color beams on the corresponding light modulating means are smaller than 0.5%.

5. A color projection system according to claim 1, said color projection system adjusted such that the light path from the at least one light source to behind the dichroic prism is situated in one plane.

6. A color projection system according to claim 1, said further optical components comprising a first imaging lens (54), whereby for each color subbeam the light path length between the first imaging lens (54) and the light modulating means (56) is equal within 1%.

7. A color projection system according to claim 6, wherein the light path length between the first imaging lens and the light modulating means is equal within 0.1%.

8. A color projection system according to claim 6, wherein the light path length between the first imaging lens and the light modulating means is equal within 0.01%.

9. A color projection system according to claim 1, said further optical components comprising a first imaging lens and said light splitting means comprising at least a first light splitting device for splitting the white beam in a first color beam comprising light of a first wavelength or wavelength region and a further color beam, whereby said first light splitting device is positioned in the pupil of the first imaging lens.

10. A color projection system according to claim 9, wherein said first light splitting device is a dichroic mirror.

11. A color projection system according to claim 10, wherein said dichroic mirror has a small incidence angle dependency.

12. A color projection system according to claim 11, said dichroic mirror transmitting a first part of the light beam and reflecting a second part of the light beam and having a 50% transmission point whereby 50% of the light beam is transmitted, wherein said small incidence angle dependency is such that the difference for the wavelength at which the 50% transmission point of the dichroic mirror is positioned for different angles of incidence, is smaller than 25 nm.

13. A color projection system according to claim 12, wherein the difference for the wavelength at which the 50% transmission point of the dichroic mirror is positioned for different angles of incidence, is smaller than 17 nm.

14. A color projection system according to claim 12, wherein the difference for the wavelength at which the 50% transmission point of the dichroic mirror is positioned for different angles of incidence, is smaller than 7 nm.

15. A color projection system according to claim 1, wherein said further optical components furthermore comprise color filters.

16. A color projection system according to claim 1, wherein said optical components comprise a further number of imaging lenses positioned in the light paths of the different color subbeams downstream the first imaging lens, wherein either for each color subbeam, the number of imaging lenses is even or for each color subbeam the number of imaging lenses is odd.

17. A color projection system according to claim 1, wherein said optical components comprise a number of mirrors positioned in the light paths of the different color subbeams, wherein either for each color subbeam, the number of mirrors is even or for each color subbeam the number of mirrors is odd.

18. A color projection system according to claim 1, wherein said light modulating means are transmissive light modulating means and wherein said color projection system comprises no mirror between said transmissive light modulating means and said dichroic prism.

19. A color projection system according to claim 1 wherein the distance is smaller than 0.007.

20. A method for projecting a color image, comprising the steps of,
driving one or more light sources to create a white light beam,
splitting said white light beam in color subbeams, each comprising light of a different wavelength or wavelength region,
imaging each of said color subbeams on a light modulating means, positioned adjacent to a side of a dichroic prism,
modulating each of said color subbeams by said light modulating means and recombining said modulated color subbeams in said dichroic prism,
projecting said recombined light beam characterized by said imaging each of said color subbeams on a light modulating means is performed such that the image on the light modulating means has equal size for each of said color subbeams and such that the image on the screen has equal orientation for each of said color subbeams and such that in an image representing a plane of equal color, the distance between the average color coordinates in the 1976 CIE Chromaticity Diagram for the ANSI-points at the left side of the image on the screen and for the ANSI-points at the right side of the image on the screen is smaller than 0.01.

21. A method for projecting according to claim 20, said imaging is performed such that the light paths between a first imaging lens being the imaging lens closest in the light path to the at least one light source and the light modulating means for each of the color subbeams are equal in length within 1%.

22. A method for projecting a color image according to claim 21, wherein the light paths between a first imaging lens, being the imaging lens closest in the light path to the at least one light source and the light modulating means for each of the color subbeams are equal in length within 0.1%.

23. A method for projecting a color image according to claim 21, wherein the light paths between a first imaging lens, being the imaging lens closest in the light path to the at least one light source and the light modulating means for each of the color subbeams are equal in length within 0.01%.

24. A method according to claim 20 wherein the distance is smaller than 0.005.

25. A method according to claim 20 wherein the distance is smaller than 0.007.

* * * * *

UNITED STATES PATENT AND TRADEMARK OFFICE
CERTIFICATE OF CORRECTION

PATENT NO. : 7,192,141 B2  Page 1 of 1
APPLICATION NO. : 10/785249
DATED : March 20, 2007
INVENTOR(S) : Van Den Bossche et al.

It is certified that error appears in the above-identified patent and that said Letters Patent is hereby corrected as shown below:

On the Title Page Item (75) should read
Brecht Halsberghe, Kuurne (BE) is an inventor.

Signed and Sealed this

Sixteenth Day of December, 2008

JON W. DUDAS
*Director of the United States Patent and Trademark Office*